Figure 1:
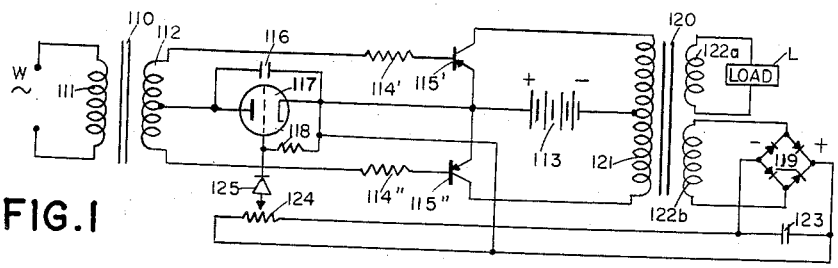

Jan. 17, 1961                    R. H. PINTELL                    2,968,738
REGULATED SOURCE OF ALTERNATING OR DIRECT CURRENT
Filed May 28, 1958                                      4 Sheets-Sheet 1

INVENTOR:
Robert H. Pintell
BY
Karl F. Ross
AGENT.

INVENTOR:
Robert H. Pintell

AGENT

Jan. 17, 1961   R. H. PINTELL   2,968,738
REGULATED SOURCE OF ALTERNATING OR DIRECT CURRENT
Filed May 28, 1958   4 Sheets-Sheet 3
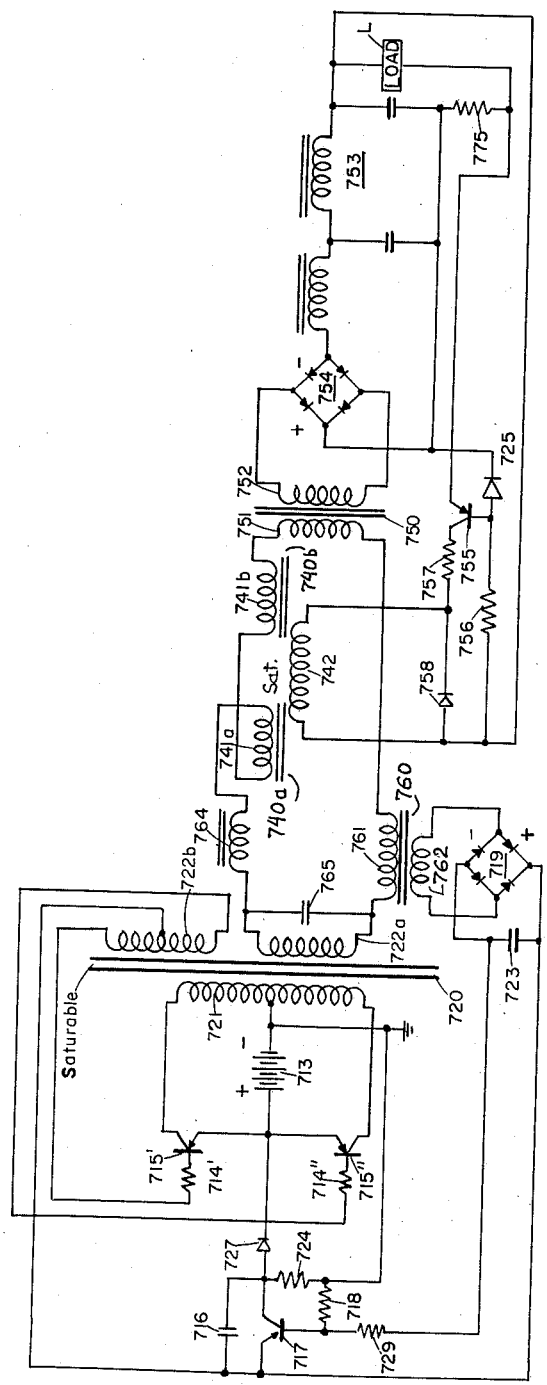
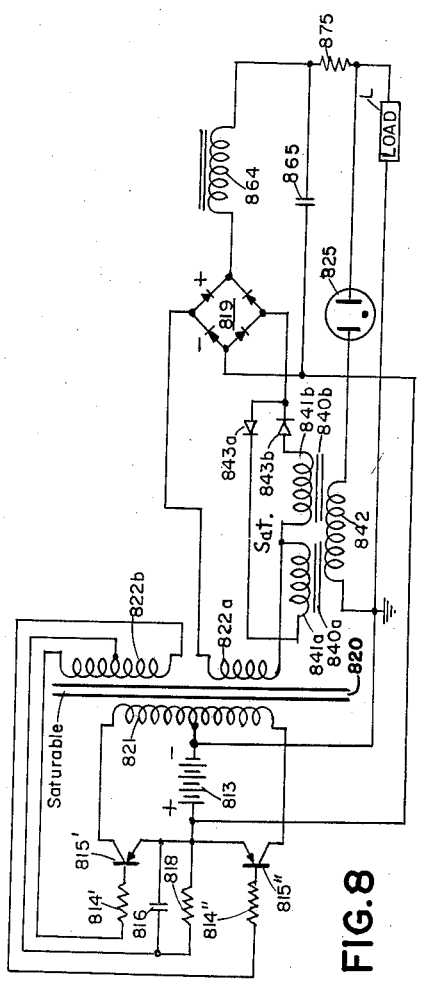
FIG.7
FIG.8
INVENTOR:
Robert H. Pintell
BY
Karl F. Ross
AGENT.

INVENTOR:
Robert H. Pintell

United States Patent Office 2,968,738
Patented Jan. 17, 1961

2,968,738

REGULATED SOURCE OF ALTERNATING OR DIRECT CURRENT

Robert H. Pintell, New York, N.Y., assignor, by mesne assignments, to Intron International, Inc., Bronx, N.Y.

Filed May 28, 1958, Ser. No. 738,538

8 Claims. (Cl. 307—150)

My present invention relates to sources of direct or alternating current, such as oscillators, amplifiers, modulators or converters, and has as its principal object the provision of means for regulating the output of such sources in the face of variations in input voltages and other circuit parameters.

In some oscillators, such as those using a saturable reactor as a frequency-determining element, the operating frequency is normally dependent upon and varies with the applied direct voltage. It is, therefore, another object of this invention to provide means for stabilizing the output frequency of such oscillator.

A further, more specific object of this invention is to provide a D.C.-to-D.C. converter having a stabilized output voltage exceeding the available input voltage.

In my co-pending application Ser. No. 603,060, filed August 9, 1956, of which the present application is a continuation-in-part, I have disclosed the use of a circuit element having a sharp bend or discontinuity in its input-voltage/output-current characteristic, hereinafter referred to as a breakdown device, as a means for regulating the output voltage or current of an oscillation generator by altering the conductivity of a resistance element in response to a continuous control current derived from the oscillator output. The present invention extends this principle to current sources other than oscillators.

Fundamentally, any adjustable impedance element directly or indirectly controllable by the flow of an electric current can be used as part of a regulator according to the invention whose function it is to reduce the drive of the controlled system in response to a rise in its output current or voltage above a predetermined limit. Such impedance elements include all the known electronic, crystalline or magnetic amplifier devices, such as vacuum tubes, transistors, double-spaced diodes, controlled rectifiers, magnetically controlled resistance elements and saturable-core reactors, as well as electro-mechanical, photo-electric and thermo-electric devices such as switching relays, photocells or indirectly heated thermistors. Similarly, the breakdown device may be electro-mechanical, electronic or crystalline in character, being for example in the form of a marginal relay, a glow tube or a Zener diode. I do not wish to imply, however, that all the various circuit elements listed above are the equivalent of one another; in fact, some of the slower-acting devices may be totally unsuited for certain applications on account of the excessive hunting introduced thereby whereas others may be objectionable from the viewpoint of excessive energy dissipation. Thus I have found that by far the most efficient and stable circuit arrangement according to the invention is one using as its control element a non-linear two-terminal device, preferably a Zener diode, exerting its regulating action through a current-responsive impedance element such as a transistor or a saturable-core device.

A more specific feature of my invention resides in the provision of a D.C.-to-D.C. autotransformer in which the rectified output of an oscillator is additively combined with the voltage of a direct-current source serving to energize the oscillator. In this system the controlling breakdown device is advantageously connected across the overall D.C. output circuit so as to be energized in response to the entire output voltage or some predetermined fraction thereof.

It has also been found advantageous, in accordance with a further feature of my invention, to provide means for regeneratively feeding back a portion of the output of an oscillatory system, regulated in the aforedescribed manner, so as to tend to increase this output to the very limit at which the regulator will begin to function; in this manner the stability of the system will be further improved.

The above and other objects, features and advantages of my invention will become more fully apparent from the following detailed description, reference being had to the accompanying drawing in which Figs. 1–10 represent ciruuit arrangements of different embodiments.

In the ensuing description I shall refer only briefly to the construction and inherent mode of operation of oscillatory and non-oscillatory amplifying systems which either are known per se or have been fully disclosed in my co-pending applications Ser. No. 603,060, mentioned above, and Ser. No. 738,385, filed on even date herewith. For the sake of simplicity, the main amplifying components of all of these systems have been shown as transistors and no attempt has been made to illustrate or to enumerate the many conventional modifications possible.

In Fig. 1 I have shown an amplifier comprising an input transformer 110, an output transformer 120 and a pair of transistors 115', 115" having their emitter-collector circuits in push-pull across respective halves of primary winding 121 in series with a source of direct current shown as a battery 113. The secondary winding 112 of transformer 110, whose primary 111 receives an input signal W of any desired wave shape from a suitable source not shown, has its extremities connected to the bases of transistors 115' and 115" by way of respective resistors 114', 114"; the center tap of this secondary is returned to the junction of the two transistor emitters through a resistance-capacitance network comprising a condenser 116 bridged across a variable resistance 117, the latter being here shown as a three-element vacuum tube. Triode 117 is normally conductive, its grid being maintained at cathode potential through a resistor 118.

Output transformer 120 has a first secondary winding 122a, connected across a load L, and a second such winding 122b which works into a full-wave rectifier bridge 119. Connected across the output terminals of bridge 119, the positive one of which is tied to the cathode of tube 117, is a filter condenser 123 in parallel with a potentiometer 124. The slider of potentiometer 124 is connected to the grid of 117 through a Zener diode 125 so poled as normally to oppose a high resistance to the flow of direct current from the positive terminal of bridge 119 through resistor 118 and diode 125 back to the negative bridge terminal.

When the voltage amplitudes in the output of transformer 120 build up sufficiently to cause a breakdown of Zener diode 125, the grid of tube 117 is driven negative to increase the resistance of the emitter-base circuits of transistors 115', 115", thereby reducing the gain of these transistors and limiting the amplitude of the load voltage produced by secondary 122a. The point at which this breakdown occurs may be adjusted by means of the potentiometer 124. As described in my co-pending application Ser. No. 603,060 referred to above, the operating point of the system may be adjusted to lie on the steep portion of the voltage/current characteristic of diode 125 whereby small departures of the bridge voltage from a predetermined value will result in an instantaneous corrective action.

Figure 2:
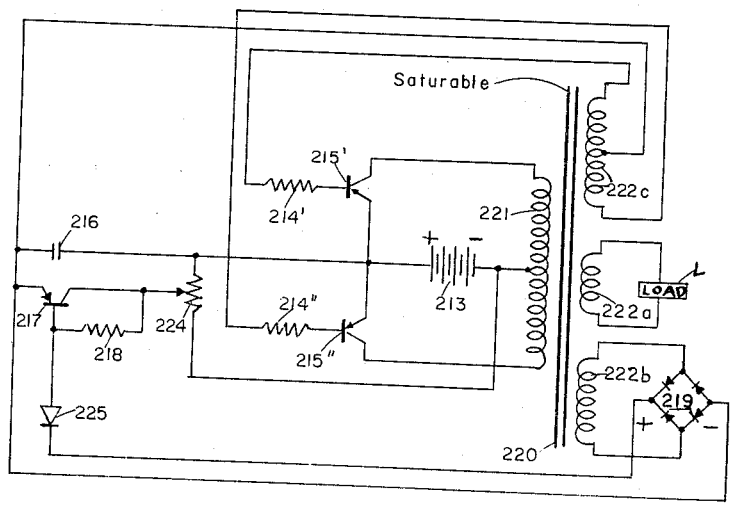

The system of Fig. 2 is an oscillator with a saturable-core transformer 220 whose primary 221 forms part of the output circuits of transistors 215′, 215″ along with a battery 213, the connection being similar to that of Fig. 1. Transformer 220 has three secondaries of which the first one, winding 222a, feeds the load L while the second one, winding 222b, energizes the rectifier bridge 219; the third secondary winding 222c is split like the primary 221 and has its extremities connected in a feedback circuit to the bases of transistors 215′, 215″ in series with resistors 214′ and 214″, respectively. The midpoint of winding 222c is returned to the transistor emitters by way of a resistance-capacitance network here shown to comprise a condenser 216 bridged across the emitter-collector circuit of an auxiliary transistor 217. The collector of transistor 217 is connected to a variable tap on a potentiometer 224 bridged across battery 213, this tap being also connected to the base of transistor 217 through a fixed resistor 218. Moreover, the base-emitter circuit of transistor 217 is connected across the output terminals of bridge 219 in series with a Zener diode 225 which is again so poled as normally to block the flow of direct current through it. When the output voltage of secondary winding 222b becomes excessive, the base of transistor 217 will be biased more positively by the control current flowing through diode 225, thereby limiting the amplitude of the oscillating current. This also stabilizes the operating frequency of the oscillator which is determined by the hysteresis loop of the saturable core of transformer 220 and, in the absence of regulation, would be affected by variations in the voltage of direct-current source 213.

Figure 3:
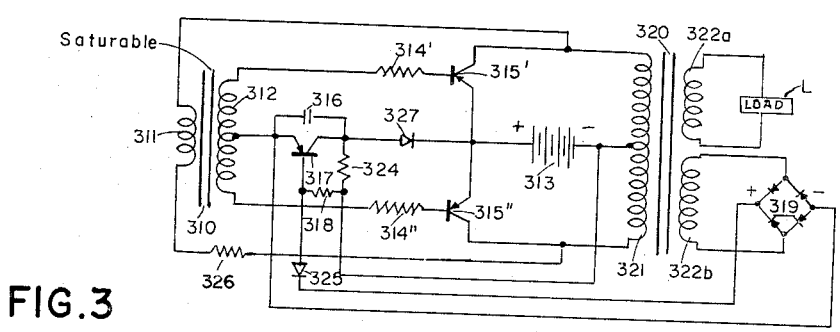

The system of Fig. 3 is generally similar to that of Fig. 2, with the major difference that output transformer 320 is not saturable and the operating frequency of the system is established by the hysteresis loop of a saturable feedback transformer 310. Primary winding 311 of transformer 310 is connected across primary winding 321 of transformer 320 in series with a current-limiting resistor 326. The split secondary 312 of the feedback transformer is connected in push-pull, in series with resistors 314′ and 314″, across the bases of transistors 315′, 315″ in a path analogous to that of windings 112 and 222c of the preceding embodiments, the emitter return including an auxiliary transistor 317 in series with a dry-contact rectifier 327. Transistor 317 has its emitter-collector circuit bridged by a condenser 316 and derives its base potential from a voltage divider composed of resistances 318 and 324, the junction of these resistances being connected to the negative terminal of battery 313. Rectifier 327 is so poled as to oppose the flow of battery current through resistor 324; in operation, this rectifier prevents the dynamic emitter potential from being driven above the potential of the positive terminal of battery 313, yet on starting substantially the full battery potential (reduced by the relatively small voltage drop across the resistors 314′, 314″ and the base-emitter resistance of resistors 315′, 315″) lies across the condenser 316 to maintain a large negative bias on the base of this transistor and to reduce its initial resistance to a small value. This facilitates the start of oscillations a soon as battery 313 has been connected in circuit.

The load L is driven by secondary 322a of transformer 320 whose other secondary 322b energizes the rectifier bridge 319. The D.-C. terminals of this bridge are again connected across the emitter-base circuit of the auxiliary amplifier 317 in series with a Zener diode 325, the latter operating in the manner previously set forth to stabilize the oscillator output as to both amplitude and frequency.

Figure 4:
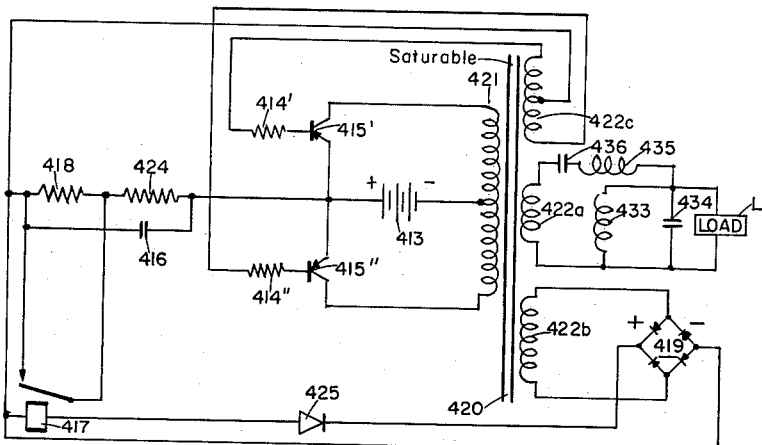

Fig. 4 shows a modification of the oscillator of Fig. 2 in which the secondary 422a of transformer 420 works into a parallel-resonant circuit 433, 434 through a series-resonant circuit 435, 436, the two resonant circuits being tuned to substantially the same frequency. As more fully explained in my co-pending application Ser. No. 738,385 of even filing date, this system will cause a sinusoidal current of that frequency to pass through the load L here shown connected across the parallel-resonant circuit. Transistors 415′ and 415″ are again connected, in series with battery 413 and individual resistors 414′, 414″, between a feedback winding 422c and the primary winding 421 of transformer 420. Secondary winding 422b works into a rectifier bridge 419 as in the preceding embodiments.

The emitter electrodes of transistors 415′, 415″ are connected to the midpoint of secondary 422c through two series-connected resistors 418, 424 bridged by a condenser 416. Resistor 418 is normally short-circuited by the armature of an electro-magnetic relay 417 connected across the output diagonal of bridge 419 in series with Zener diode 425. (If relay 417 is marginal, then diode 425 may be omitted.) When the output amplitude of the oscillator reaches a predetermined level, relay 417 will operate and open the shunt across resistor 418 so as to reduce the gain of the transistors 415′, 415″.

Figure 5:
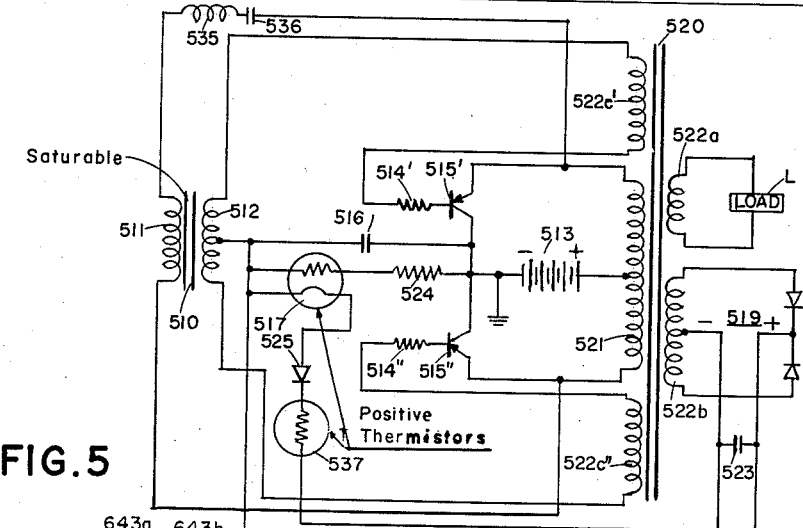

Another form of oscillator, using a saturable-core transformer but having its operating frequency determined by a reactive circuit, is shown in Fig. 5. Here the emitters of transistors 515′, 515″ are connected across transformer primary 521 whereas the collectors are maintained at fixed potential, as indicated for the sake of clarity by the symbolic ground connection which could of course be omitted without materially altering the mode of operation of the system. The ungrounded positive terminal of battery 513 is connected to the midpoint of winding 521. Transformer 520 has four secondaries, including winding 522a connected across load L, split winding 522b connected in a full-wave rectifier circuit 519 across a filter condenser 523, and two windings 522c′, 522c″ connected between the bases of transistors 515′, 515″, in series with resistors 514′ and 514″ respectively, and the extremities of secondary 512 of feedback transformer 510. The primary 511 of saturable transformer 510 is connected across primary 521 by way of a series-resonant circuit 535, 536 which determines the operating frequency of the system, again as more fully set forth in my simultaneously filed application Ser. No. 738,385.

The grounded collectors of the transistors 515′, 515″ are connected to the midpoint of secondary 512 via a resistance-capacitance network comprising a condenser 516 bridging the series combination of a resistor 524 with the resistance winding of an indirectly heated positive thermistor 517. The heating element of this thermistor is connected across rectifying network 519, in parallel with condenser 523, through a Zener diode 525 in series with a directly heated positive thermistor 537. The function of thermistor 537 is to compensate for changes in the voltage response of Zener diode 525 due to variations in ambient temperature.

The output of the system of Fig. 5 is a square wave whose fundamental frequency is the resonance frequency of the series-tuned circuit 535, 536. Windings 522c′ and 522c″ act to impress upon the bases of transistors 515′, 515″ an alternating voltage supplementing the driving voltage furnished by transformer 510, this being desirable in order to overcome the effect of the grounded collectors upon the base potential. The operation of the circuit arrangement of Fig. 5 is otherwise analogous to that of the preceding embodiments, the development of an excessive control voltage across the direct-current terminals of rectifier network 519 causing a breakdown of diode 525 with resulting increase in the resistance of thermistor 517 in series with resistor 524.

Figure 6:
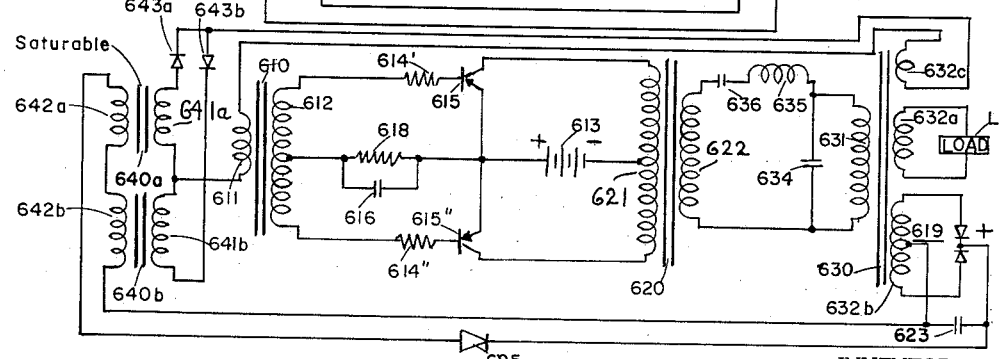

Fig. 6 shows an oscillator operating on the principle of the system of Fig. 4 but using a different form of regulator. The connection of transistors 615′, 615″, in series with resistors 614′, 614″ and battery 613, between transformer windings 612 and 621 is analogous to the arrangement of Fig. 1, except that a fixed resistor 618 in parallel with condenser 616 replaces the amplifier device 117. Secondary winding 622 of transformer 620 is connected across a series-resonant circuit 635, 636 and a parallel-resonant circuit 631, 634 in series, the inductive branch 631 of this latter circuit constituting the primary of a further transformer 630 having a secondary 632a connected across load L and another secondary 632b connected in a full-wave rectifying circuit 619 across a condenser 623. A further secondary 632c of transformer 630 is connected across the primary 611 of feedback transformer 610 through two parallel branches including windings 641a, 641b in series with rectifiers 643a, 643b, respectively. Windings 641a, 641b are wound on cores 640a, 640b, respectively, of a saturable magnetic amplifier, the rectifiers 643a, 643b being inversely poled so that each of these windings is traversed only by unidirectional current while the entire output of winding 632c passes through feedback winding 611. The pulsating current in windings 641a, 641b normally saturates the cores 640a, 640b so that the impedance of these windings is low. Biasing windings 642a, 642b on cores 640a, 640b, respectively, are connected in series with each other and with a Zener diode 625 across the output of rectification network 619. The polarity of network 619 and of diode 625 is so chosen that breakdown of the diode will allow the flow of a current through biasing windings 642a, 642b in such sense as to cancel the saturation of the cores, thereby causing the windings 641a, 641b to offer an increased impedance to the flow of alternating current from winding 632c.

Fig. 7 shows a further development of a system according to the invention in which the alternating output of an oscillation generator is converted to a continuous load current. The oscillation generator is fundamentally similar to that of Fig. 2, comprising a pair of principal transistors 715′, 715″, series resistors 714′, 714″, a source of direct current shown as a battery 713 with grounded negative terminal, and a saturable-core transformer 720 having a primary winding 721 and a secondary feedback winding 722b all connected as previously described. The center tap of winding 722b is returned to the positive battery terminal through the emitter-collector path of an auxiliary transistor 717 which is shunted by a condenser 716 and in series with a rectifier 727, the collector of this transistor being grounded through a resistor 724. The base-emitter circuit of transistor 717 is connected, in series with a resistor 729, across a condenser 723 which is bridged across the direct-current output terminals of a full-wave rectifier bridge 719, another resistor 718 extending between the transistor base and ground.

Another secondary winding 722a of transformer 720 feeds the primary 751 of a load transformer 750 and the primary 761 of a feedback transformer 760 in series with windings 741a, 741b on cores 740a, 740b of a saturable reactor. Advantageously, a filter comprising a choke 764 and a condenser 765 are included in this circuit to suppress the higher harmonics of the fundamental operating frequency of the oscillator. It should be noted that, in contradistinction to the systems described above, bridge 719 is so energized from secondary 762 of transformer 760 as to render the transistor 717 more highly conductive with increasing amplitudes of the oscillator output; this regenerative action tends to maintain the drive of the oscillator at a value near that which will cause the regulator including saturable reactor 740a, 740b to go into action.

The regulator circuit of Fig. 7 includes a biasing winding 742 on the saturable reactor which is normally energized, in the non-overloaded state of a Zener diode 725, by direct current from a rectifier bridge 754 connected across the secondary 752 of transformer 750. The output current of this bridge is supplied, through a filter network 753, to the load L and, in series therewith, to a resistor 775 across which there is developed a voltage drop proportional to the load current. The negative terminal of resistor 775 is connected to the emitter of an auxiliary transistor 755. The base of this transistor is connected to the positive terminal of bridge 754 through the reverse resistance of diode 725 and to the negative load terminal through a resistance 756. The same load terminal is also connected to the collector of transistor 755 by way of biasing winding 742 and a fixed resistor 757. Winding 742 is shunted by a rectifier 758 designed to protect the transistor 755 from overloading by pulses of the same polarity as the biasing current which might be induced in winding 742 by the appearance of transients in the reactor circuit. Resistors 756 and 757 are so dimensioned that the current normally passing through winding 742 saturates the cores 740a, 740b to reduce the impedance of windings 741a, 741b to a low value; when the current through load L and resistor 775 exceeds a predetermined magnitude, diode 725 breaks down and applies a positive bias to the base of transistor 755, thereby sharply reducing the flow of current through winding 742 and lifting the saturation of the reactor cores. The resulting increase in the inductance of windings 741a, 741b decreases the amplitude of the A.C. input to bridge 754. This embodiment thus represents an example of a current regulator according to the invention.

The system of Fig. 7 affords complete galvanic separation between the source 713 of input direct current and the source 754 of output direct current supplied to the load L. Where such separation is not required, the two sources may be serially interconnected in aiding relationship to boost the available output voltage, or to reduce the amount of power delivered by the battery to the oscillatory system for a given output voltage, as has been illustrated in Fig. 8. In this embodiment the battery 813, which energizes the transistors 815′, 815″ by way of transformer primary 821 in the previously described manner, has its negative terminal grounded and its positive terminal connected to the negative D.C. terminal of a rectifier bridge 819 which is energized from a secondary 822a on transformer 820 through windings 841a, 841b and rectifiers 843a, 843b of a magnetic amplifier generally similar to that of Fig. 6. Another secondary winding 822b of saturable-core transformer 820 is connected across the bases of the transistors by way of series resistors 814′, 814″ and has its midpoint tied to the positive battery terminal, as well as the transistor emitters, via a resistance-capacitance network comprising resistor 818 and condenser 816.

The load L is connected between ground and the positive output terminal of bridge 819 through a filter network comprising a choke 864 and a condenser 865. Connected across the load L is a breakdown device 825, here shown as a glow tube, in series with the biasing winding 842 which is common to both cores 840a, 840b of the magnetic amplifier. Tube 825, being ionized, operates on a steep portion of its current/voltage characteristic and draws enough current to make the voltage drop across the resistive components of its supply circuit (symbolized by the series resistance 875) just counterbalance the difference between its sustaining voltage and the higher output voltage of bridge 819. The current drawn by tube 825 passes through the winding 842 which is so proportioned that the cores 840a, 840b of the magnetic amplifier become unsaturated whenever the bridge voltage tends to rise above its rated value. Thus, the operation of the regulator circuit in Fig. 8 is similar to that of the corresponding circuits in the embodiments previously described.

Figures 9, 10:
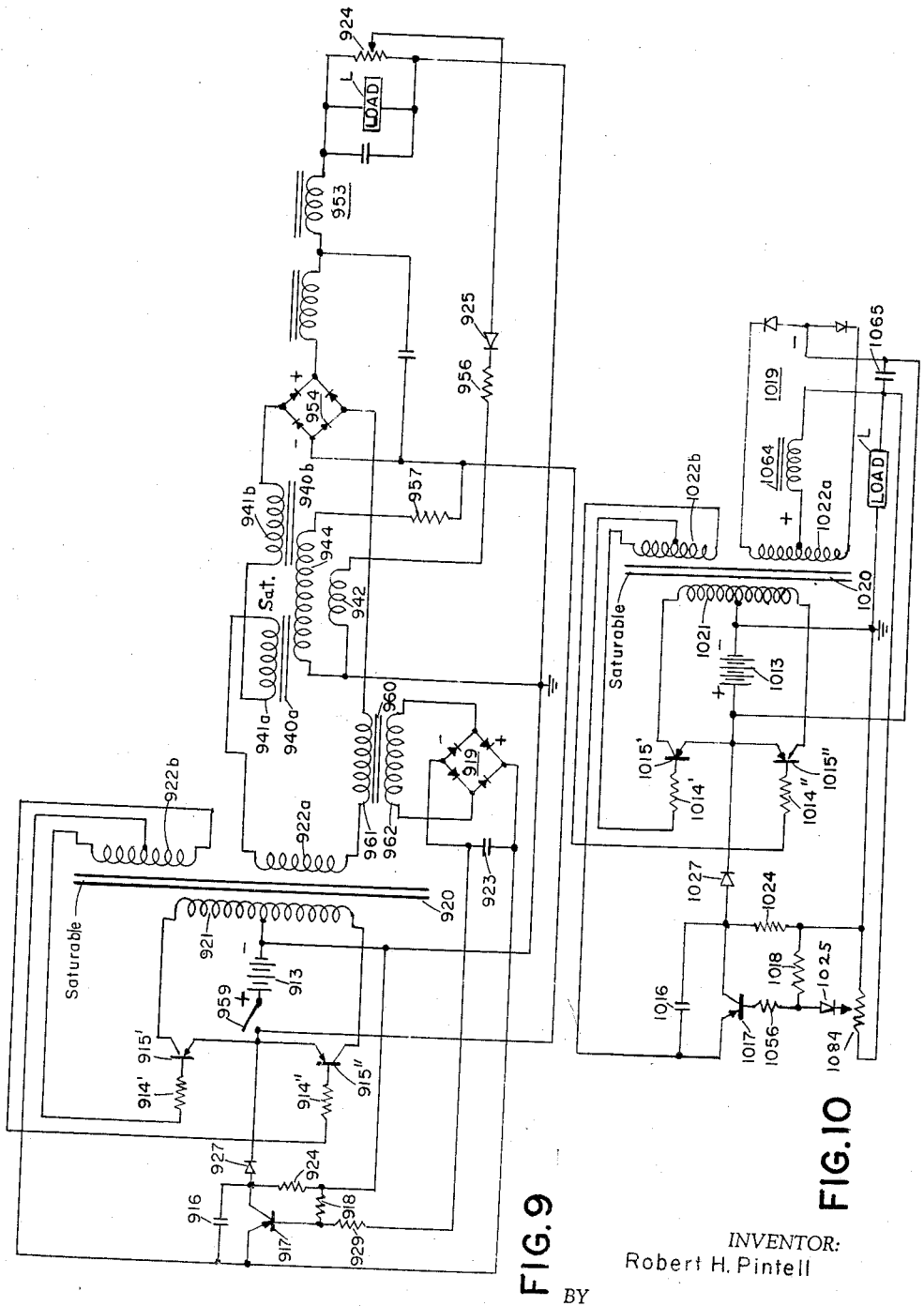

Fig. 9 shows a direct-current autotransformer similar to that of Fig. 8 but incorporating the positive-feedback feature of the system of Fig. 7. As in Fig. 7, the input circuit of the oscillator comprising transistors 915′, 915″ includes a transistor 917, bridged by a condenser 916, as well as the series resistors 914′, 914″ connected to respective extremities of the feedback winding 922b on saturable-core transformer 920. The base-collector circuit of transistor 917 includes the battery 913 as well as a biasing network including rectifier 927 and resistances 918 and 924, the base of this transistor being returned to its emitter through a series resistor 929 and the D.C. terminals of a rectifier bridge 919 shunted by a condenser 923. Bridge 919 is energized from the secondary 962 of a feedback transformer 960 whose primary 961 is connected across secondary 922a of transformer 920 in series with a rectifier bridge 954 and windings 941a, 941b of a saturable reactor. A starting switch 959 in series with battery 913, whose negative terminal is grounded, serves to close the emitter-collector circuits of transistors 915′, 915″ through transformer primary 921 and, in parallel therewith, a magnetizing circuit for the saturable reactor comprising a resistor 957 in series with a winding 944 on the reactor cores 940a, 940b. Winding 944 is so dimensioned that cores 940a, 940b are normally saturated to minimize the inductance of windings 941a and 941b.

The output of rectifier bridge 954 is delivered, through a filter network 953, to the load L shunted by the potentiometer 924; a biasing circuit for the saturable reactor, including a winding 942 on its cores 940a, 940b in series with a resistor 956 and a Zener diode 925, extends from ground to the slider of this potentiometer. The polarity of diode 925 is again so chosen that a current capable of unsaturating the cores 940a, 940b will traverse the biasing winding 942 whenever the voltage across load L exceeds a predetermined limit, this limit being adjustable by varying the setting of potentiometer 924. The polarity of bridge 919 is again so chosen that the resistance of transistor 917 in series with the driving circuit of the oscillator varies regeneratively so as to tend to maintain the operating point of the system at a value on or just ahead of the steep portion of the current/voltage characteristic of Zener diode 925.

Fig. 10 shows a simplified D.C. autotransformer according to the invention in which the ungrounded positive terminal of battery 1013 is tied to the negative terminal of a rectification network 1019 which includes the secondary 1022a of a saturable-core transformer 1020 and feeds the load L, in parallel with a potentiometer 1084, through a smoothing filter including a choke 1064 and a condenser 1065. The main oscillator transistors 1015′, 1015″, with their base resistors 1014′ and 1014″, are connected in the aforedescribed manner between primary 1021 and secondary 1022b of transformer 1020 by way of an auxiliary transistor 1017 provided with bridging condenser 1016, collector-biasing rectifier 1027 and voltage divider 1018, 1024. The base of transistor 1017 is connected through series resistor 1056 and Zener diode 1025 to the slider of potentiometer 1084. As in the system of Fig. 2, breakdown of diode 1025 will drive the base of transistor 1017 more positive to limit the drive of the oscillator by increasing the series resistance in its feedback path.

It will be apparent that the input and output direct-current sources in Figs. 8–10 could also be interconnected in bucking rather than aiding relationship (as by a simple reversal of the polarity of bridge 819 in Fig. 8) if, for any reason, it should be desirable to have an output voltage which is lower than the battery voltage. Furthermore, such features as the regenerative direct-current feedback circuit 717, 719 (Fig. 7) or 917, 919 (Fig. 9) and other elements shown in certain embodiments could be combined with, or substituted for, features illustrated in other embodiments, to the extent of compatibility, without the exercise of independent invention. Also, while I have shown the various oscillator and amplifier circuits as being of the push-pull type, the invention is equally applicable to single-ended or unbalanced systems. Again, as disclosed in my simultaneously filed aplication Ser. No. 738,385, the driving energy for the system need not be obtained from a source of direct current. These and other modifications and adaptations should be readily apparent to persons skilled in the art and are intended to be embraced in the spirit and scope of the invention as defined in the appended claims.

I claim:

1. A circuit arrangement for producing an electrical output of a magnitude not exceeding a predetermined limit, comprising a source of driving voltage, amplifier means connected to said source for converting the output thereof into an alternating voltage, said amplifier means having an input circuit and an output circuit, rectifier means in said output circuit for converting said alternating voltage into a continuous voltage, a voltage-responsive breakdown device connected to said rectifier means for energization by said continuous voltage, and variable-impedance means in one of said circuits controlled by said breakdown device for reducing the effective gain of said amplifier means in response to a rise in the magnitude of said continuous voltage above a predetermined value.

2. A circuit arrangement for producing an electrical output of a magnitude not exceeding a predetermined limit, comprising oscillator means provided with an input circuit and an output circuit, a source of direct current conected in said input circuit for energizing said oscillator means, rectifier means in said output circuit for converting the output of said oscillator means into a continuous voltage, a voltage-responsive breakdown device connected to said rectifier means for energization by said continuous voltage, and variable-impedance means in one of said circuits controlled by said breakdown device for reducing the output of said oscillator means in response to a rise in the magnitude of said continuous voltage above a predetermined value.

3. A circuit arrangement according to claim 2 wherein said rectifier means has a terminal connected to a terminal of said source, said breakdown device being connected across the series combination of said source and said rectifier means.

4. A circuit arrangement according to claim 3 wherein said rectifier means and said source are interconnected in series-aiding relationship.

5. A circuit arrangement for producing a substantially constant electrical output, comprising a generator of alternating voltage including amplifier means provided with an input circuit and an output circuit, rectifier means connected in said output circuit for deriving a first and a second continuous control voltage from said alternating voltage, first variable-impedance means inserted in said input circuit and provided with a control terminal operatively connected to said rectifier means for regeneratively varying the gain of said amplifier means in response to said first control voltage, and second variable-impedance means inserted in said output circuit and provided with a control terminal operatively connected to said rectifier means for increasing the impedance of said output circuit in response to said second control voltage.

6. A circuit arrangement according to claim 5, further comprising a two-terminal non-linear impedance element inserted between said rectifier means and the control terminal of said second variable-impedance means, said non-linear impedance element having in its current/voltage characteristic a sharp bend followed by a steep portion, said first and second variable-impedance means being adjusted to maintain the operating point of said non-linear impedance element substantially at said bend.

7. A circuit arrangement according to claim 6 wherein said non-linear impedance element comprises a Zener diode connected to present in its non-overloaded state a high resistance to the passage of said second control voltage.

8. In combination, an amplifier and a regulator for said amplifier, said amplifier having a direct-current output circuit and a transmission path of variable impedance determining the magnitude of a continuous voltage developed across said output circuit, an adjustable impedance element in said transmission path provided with a control terminal, and circuit means connecting said output circuit to said control terminal for degeneratively applying thereto at least a portion of said continuous voltage, said circuit means including a diode connected normally to present a high resistance to said continuous voltage and adapted to break down in response to a rise of said continuous voltage above a predetermined value.

References Cited in the file of this patent

UNITED STATES PATENTS

| | | |
|---|---|---|
| 2,776,382 | Jensen | Jan. 1, 1957 |
| 2,832,900 | Ford | Apr. 29, 1958 |
| 2,850,695 | Bishop | Sept. 2, 1958 |